106-98
8/23/77    AU 115    EX
           XR  4,043,827

United States Patent [19]
Bernett

[11] 4,043,827
[45] Aug. 23, 1977

[54] SAG-RESISTANT DRY-SET MORTAR COMPOSITION

[75] Inventor: Frank E. Bernett, Yardley, Pa.

[73] Assignee: Tile Council of America, Inc., Princeton, N.J.

[21] Appl. No.: 625,749

[22] Filed: Oct. 24, 1975

Related U.S. Application Data

[63] Continuation of Ser. No. 412,152, Nov. 2, 1973, abandoned.

[51] Int. Cl.$^2$ .............................................. C04B 7/352
[52] U.S. Cl. ........................................ 106/92; 106/93; 106/98; 106/314; 260/29.6 S
[58] Field of Search ........................ 106/90, 92, 93, 97, 106/98, 314, 315; 260/29.6 S

[56] References Cited

U.S. PATENT DOCUMENTS

| | | | |
|---|---|---|---|
| 2,868,753 | 1/1959 | Morgan | 106/90 |
| 2,985,239 | 5/1961 | Shell | 106/98 |
| 3,243,307 | 3/1966 | Selden | 106/93 |
| 3,824,107 | 7/1974 | Weiant | 106/93 |
| 3,937,633 | 2/1976 | Knight et al. | 260/29.6 S |

*Primary Examiner*—J. Poer
*Attorney, Agent, or Firm*—Morgan, Finnegan, Pine, Foley & Lee

[57] ABSTRACT

Portland cement mortar compositions containing sand and a cellulos ether are modified with certain clay, certain long-chain organic compounds, or mixtures thereof.

19 Claims, No Drawings

SAG-RESISTANT DRY-SET MORTAR COMPOSITION

CROSS-REFERENCE TO RELATED APPLICATION

This is a continuation of application Ser. No. 412,152 filed Nov. 2, 1973, now abandoned.

BACKGROUND OF THE INVENTION

1. Field of the Invention

This invention relates to mortar compounds for setting tile and, in particular, for setting ceramic tile. The invention relates specifically to dry-set mortar compositions which are sag-resistant.

2. Description of the Prior Art

At present tile and, particularly ceramic tile, is set in many cases by dry-set Portland cement mortars. For many years the Portland cement compositions used required a very thick bed and generally also required a mortar coat for setting the tile. Eventually, these thick-mud-method Portland cement mortars were replaced to a great extent by thin-bed Portland cement dry-set mortars. Typical dry-set mortars are thin-bed mortars and are principally comprised of Portland cement, sand, a water retentive cellulose ether, such as methyl cellulose or hydroxyethyl cellulose. Water is added prior to use. U.S. Pat. No. 2,934,932 (Wagner; issued May 3, 1960) and U.S. Pat. No. 3,243,932 (Selden; issued Mar. 29, 1966) are illustrative of the dry-set mortars which are currently used to set tile in thin beds. On other occasions a rubber or polymer latex is added to the dry mix to make a mortar, which is then called a latex Portland cement mortar. The latex may contain some of the additives in solution that otherwise would be part of the dry mix.

One of the many properties required by mortar for setting tile is that it be sag resistant. Sag resistance is a term used in the trade and defined by a test method that is part of the American National Standard Specification for Dry-set Portland Mortar Cement — A 118.1. Sag-resistance is a property or a characteristic relating to the ability of the mortar to resist movement under load until a certain load level is reached. This property or characteristic is vitally important in dry-set mortars and also to a latex mortar since a mortar to be practically functional, must be in a slurry or paste form on the one hand, but also must be capable of supporting the load imposed on it by the tiles being set. It is vital that the mortar support the tile without any appreciable sinking of the tile into the mortar during the period in which the mortar sets. In wall applications sag resistance is even more critical because the mortar must hold the tile in position on the wall during the period in which the mortar is setting.

At present, short asbestos fibers are used to provide dry-set mortars with sag-resistant characteristics. Illustrative of the dry-set mortar compositions having fibers to resist sag are U.S. Pat. No. 3,030,258 (Wagner; issued Apr. 17, 1962) and U.S. Pat. No. 3,243,307 (Selden; issued Mar. 29, 1966). Although the asbestos fibers and fibers in general are suitable for providing dry-set mortars with sag-resistant properties, asbestos fibers and fibers in general have been found to be dangerous to the health of persons who ingest them into their lungs and the use thereof has recently been limited by national safety laws.

SUMMARY OF THE INVENTION

A particular object of the present invention is to provide dry-set mortars with the property of sag resistance without introducing any ingredient which is undesirable or harmful to the individuals who must work with the dry-set mortars.

The present invention provides the use of certain clays, certain long-chain organic polymers or a combination of clays and long-chain organic polymers. Illustrative of these clays that perform to provide mortar with sag resistance are attapulgite clays and montmorillonite clays. The long-chain polymers are certain hydrophilic long-chain organic polyelectrolytes and certain anionic long-chain organic molecules. Illustrative of the long-chain organic polyelectrolytes and anionic molecules are acrylamides, ethylene oxide, alkali metal salt of carboxymethyl cellulose, starch and starch derivatives.

DESCRIPTION OF THE PREFERRED EMBODIMENT

The invention of this application is a composition which is used to set ceramic tile, brick slate, small stones and other similar products both on walls and on floors. The composition must have suitable properties for holding the tile or other material on the wall or floor securely and uniformly. Elevational differences in the tiles on the floor and irregular positioning of tiles on the wall cannot be tolerated One of the most significant properties that the mortar must have is sag resistance. Sag resistance is a matter of degree. An otherwise effective dry-set mortar can be formulated which would have virtually no sag resistance. However, great difficulty would occur when tiles were attempted to be set on walls. The tile would slide down out of position because the mortar would not hold the tiles by virtue of its own characteristics.

The tile setting mortar composition of the invention is comprised of a conventional Portland cement mortar composition with small amounts of certain clays, certain long-chain organic compounds or combinations of clays and long-chain organic compounds.

Conventional Portland cement mortar compositions consist of Portland cement and a filler-like sand or Portland cement, and a water soluble cellulose ether, e.g. methyl cellulose, methyl hydroxypropyl cellulose or hydroxyethyl cellulose. Dry set mortars also may include polyvinyl alcohol and other ingredients.

The clays which have been found to provide suitable sag resistance to the conventional Portland cement mortar compositions independent of any other ingredient are attapulgite clays and montmorillonite clays. Specifically, ATTAGEL 150 (Minerals and Chemicals Corp. of America), ATTAGEL 40 (Minerals and Chemicals Corp. of America) and bentonite clay are particularly suitable for providing sag resistance to Portland cement mortar compositions. The provision of from about 0.5 to 3.0 per cent by weight of ATTAGEL 150, ATTAGEL 40 or bentonite clay provide conventional Portland cement compositions with good sag resistant properties.

The long-chain polymers which have been found to provide sag resistance to Portland cement mortar compositions are certain long-chain organic compounds which have a Flocculation Index of less than 0.5 RETEN (Hercules, Inc.) RETEN A-1(Hercules, Inc.), Alum Hydroxalkyl starch (Hercules, Inc. CERON 1104-B) sodium carboxymethyl cellulose having a degree of esterification between 0.2 and 0.5 and a 1 percent viscosity of 1000 to 4000 cps, and polyacrylamide (Dow Chemical Co. SEPARON N P.20) are illustrative of the long-chain organic polymers which provide sag resistance in conventional Portland cement mortar compounds.

The long-chain organic compounds suitable for use in the invention have a Flocculation Index below 0.50, preferably below 0.04 and most desirably below 0.30. The long-chain organic compounds can be anionic, cationic or nonionic.

The long-chain organic compounds with a Flocculation Index below 0.50 provide good sag resistance in dry-set Portland cement mortars when they are between 0.01 and 0.25 percent by weight of the composition.

The discovery herein involves the use of a long-chain organic compound in a cement slurry to promote sagresistance. The most useful such compounds are those which have a Flocculation Index below 0.50 and are capable of dissolving to some extent in a cement slurry. The following test method is used to determine the Flocculation Index of a long-chain polymer:

Flocculation Index Test Method to evaluate flocculating effect of soluble organic compounds on Portland cement in a water slurry.
  a. Mix 30 grams of Portland cement with 190 grams of water and shake the mixture to disperse the cement.
  b. Immediately after shaking, pour the mixture into a 200 ml graduate and start a stop watch when the graduate is filled to approximately 200 ml.
  c. As the cement particles settle, a line between the clouded slurry and the relatively unclouded upper portion of the liquid in the graduate is visibly discernable. When this line falls to the 160 ml mark on the graduate, stop the watch and record the elapsed time in seconds as the Settling Time.
  d. Repeat the above procedure but dissolving small amount of the organic material to be tested as a flocculant in the water before combining it with the dry cement.
  e. The ratio of the Settling Time with flocculant to the Settling Time with out flocculant is an index of the effectiveness of the added organic compound or mixture, i.e. the Flocculation Index.

It has been found that organic additives that give a Flocculation Index of 0.5 or less are effective in this invention, although those that give an index or 0.4 or less are preferred. It has also been found that some additives that give high Index at one concentration give lower ones at other concentrations. Sometimes increasing the amount of additive lowers the Index and sometimes decreasing it lowers the Index.

Generally, 0.005 grams of additive in the mixture of 30 grams of cement and 190 grams of water is a useful level at which to make an evaluation. Example I shows results of this test used to evaluate long-chain organic polymers as useful flocculants for effecting sag resistance in dry-set mortars.

Although the applicant does not wish to be bound by any particular theory of operation, it appears that the sag resistance effected by this invention is the result of controlled flocculation of particles in the mortar. Dry-set mortar without some special additive to effect sag resistance is thixotropic or psuedo plastic in nature and has a very low yield value. Yield value is rheological property of a slurry that means it will not flow until some level of force is applied. After that level of force is reached, the slurry flows exhibiting viscous properties which are thixotropic in nature. The yield values of the basic dry-set mortar is minimal and not sufficient to effect any sag resistance as defined herein.

However, if particles in the mortar can be made to connect loosely in strings or clumps, the yield value of the mortar is increased and sag resistance is effected.

The applicant has found that certain clays when in the cement slurry environment will connect loosely with themselves and probably with the cement particles also to effect the desired sag resistance, and has found that unusually small amounts of clays have utility whereas larger amounts of drastic effects on the mortar that render it undesirable or useless for the purpose of setting tile and the like. Particularly, clays of the attapulgite and montmorillonite groups give the desired sag resistance in the cement slurry environment without special help. Other clays, such as kaolin for example, do not effect the desired sag resistance without special help.

Although clays have been added to cement mortars for various reasons for centuries, the amounts have been always much greater and the effects have been different. The clays in this invention have been found effective in dry-set mortars at levels between 0.5 and 3.0 percent by weight of the dry mortar mix. Above the level of about 3.0 percent, the effect is to stiffen the mix so that it is unworkable or alternately to require the addition of excess water to thin the mortar which harms its final properties by weakening it and causing undesirable shrinkage.

The applicant has also discovered that certain long-chain organic polymers when added to the mix in very small amounts apparently cause the particles in the mortar to string or clump loosely and thereby effect a higher yield value. Such organic molecules have the ability to flocculate cement particles in the slurry when they are present in certain critical amounts. Very often if an effective organic molecule is present in larger amounts it behaves completely differently and effects no increase in yield value at all, while in some other cases the molecules apparently connect less loosely to the cement particles and at larger amounts in the mix they cause excess stiffening of the mortar much like that caused by excess clays as described above.

While the long-chain organic polymers that effect sag resistance are generally in the category called flocculants or flocculating aids, not all substances called flocculants or flocculating aids are functional in this invention. Some which are effective flocculants in sewerage and water treatment for instance are not effective in a cement mortar. It is believed that they sometimes are precipitated in the cement slurry by the polyvalent ions present, such as calcium and aluminum. An example is polyacrylic acid. Other times they may connect to the particles at so many sites along the chain that they effectively wrap around only one or two particles and do not effect a string or clump. At any rate, it has been found that a simple test will evaluate a molecule's ability to function to effect sag resistance in the cement mortar.

The test evaluates the ability for a given amount of additive to flocculate Portland cement, and it is described in detail in Example I.

Now it also has been discovered that when both clay of the attapulgite or montmorillonite groups and a long-chain organic polymer are combined in the same mortar, the ability of the clay to effect sag resistance is increased so that less clay is required and less organic polymer is required than would be equally effective if each were used alone. But more surprising is the discovery that other clays and fine fillers that have negligible effect alone are activated by the presence of the effective long-chain organic polymers described in this invention. When they are present with a small amount of a polymer, sag resistance is achieved which is better than the polymer at that level could achieve by itself.

Consequently, this invention encompasses the use of certain clays in small amounts, certain long-chain organic polymers which give a Flocculation Index below 0.5, determined as described herein, and combinations of the long-chain organic polymers with the certain clays, as well as with other clays and fine fillers, each and all of which are believed to effect sag resistance is a cement mortar by the same mechanism, namely by loosely connecting the particles in the mortar into strings or clumps.

The combination of certain clays and long-chain polymer flocculants or coagulants prove to provide especially good sag resistance properties for conventional Portland cement mortars. Further, clays in addition to attapulgite and bentonite clays can be used when used in combination with certain long-chain organic compounds.

EXAMPLE I

Using the Flocculation Index Test Method recited in this specification the following organic compounds were tested for their ability to flocculate portlant cement, and their Flocculation Index was calculated.

|  | Additive to Portland Cement and Water Mixture | Amount of Additive-gms | Settling Time (Seconds) | Flocculation Index |
|---|---|---|---|---|
| 1. | None | — | 100 | 1.00 |
| 2. | Polyacrylamide, Separan NP-10 | .005 | 15 | .15 |
| 3. | Polyacrylamide, Separan NP-10 | .05 | 15 | .15 |
| 4. | Polyacrylamide, Separan NP-20 | .005 | 14 | .14 |
| 5. | Modified Starch, Ceron 1104-B | .005 | 34 | .34 |
| 6. | Modified Starch, Ceron 2069 | .005 | 45 | .45 |
| 7. | Modified Starch, Staramic 211 | .005 | 25 | .25 |
| 8. | Polyethylene Oxide, Polyox 3253 | .005 | 85 | .85 |
| 9. | Methylcellulose MC-4000-65HG | .005 | 55 | .55 |
| 10. | Polyacrylamide, Reten A-1 | .005 | 11 | .11 |
| 11. | Polyacrylamide, Reten 200 | .005 | 60 | .60 |
| 12. | Polyacrylamide, Reten 205 | .005 | 44 | .44 |
| 13. | Polyacrylamide, Reten 834.1 | .010 | 84 | .84 |
| 14. | Polyacrylamide, SPX-5015 | .025 | 60 | .60 |
| 15. | Polyacrylic Acid PAA-25 | .005 | 80 | .80 |
| 16. | Sodium Carboxymethyl-Cellulose SPX-5043 | .005 | 86 | .86 |
| 17. | Sodium Carboxymethyl-Cellulose SPX-5043 | .05 | 32 | .32 |
| 18. | Polyacrylamide, Reten 200 | .030 | 40 | .40 |
| 19. | Sodium Carboxymethyl-Cellulose, CMC-190 High | .010 | 73 | .73 |

EXAMPLE II

The following Dry-Set portland cement mortar dry mix was made:

| | |
|---|---|
| portland cement | 393.2 gms |
| methylcellulose (4000 cps) | 3.8 gms |
| sodium carboxymethylcellulose (D.S. of approx. 0.4) | 1.0 gms |
| polyvinyl alcohol (73% to 77% hydrolyzed) | 1.2 gms |
| urea | 0.8 gms |
| silica sand (−30 mesh) | 600.0 gms |
| Total | 1000.0 gms |

To 300 gms of the dry mix 69 ml. of water was added to bring it to a workable consistency. Following the procedure for measuring "sag on Vertical Surfaces" from American National Standard Specification for Dry-Set Portland Cement Mortar - A118.1-1967, the mortar was tested. It showed no sag. In all other properties, for which it was tested, it proved to be a good Dry-Set mortar. The sodium carboxymethylcellulose with degree of etherification (D.S.) of between 0.2 and 0.5 proved to be a good substitute for asbestos fibre. It gave a Flocculation Index of 0.32 when tested as described in Example I at a 0.5 gram level.

EXAMPLE III

The mix and experiments of Example II were repeated except that hydroxethylcellulose (30,000 cps) was substituted for the methylcellulose. The mortar showed no sag and had good properties throughout.

EXAMPLE IV

The following Dry-Set mortar mix was made:

| | |
|---|---|
| portland cement | 393.0 gms |
| sodium carboxymethyl cellulose (D.C. of approx. 0.4) | 2.0 gms |
| polyvinyl alcohol (73% to 77% hydrolyzed) | 5.0 gms |
| sand (−30 mesh) | 600.0 gms |
| Total | 1000.0 gms |

When a portion of the mix was made into a workable mortar by the addition of water, it showed no sag in the standard test, but it had a tendency to be hard to trowel on the wall. It was judged to define generally the upper limit of the amount of sodium carboxymethyl cellulose practical in a Dry-set mortar.

EXAMPLE V

The following Dry-Set mortar mix was made:

| | |
|---|---|
| portland cement | 392.8 gms |
| sodium carboxymethylcellulose (D.S. approx. 0.4) | 1.0 gms |
| polyvinyl alcohol (73% to 77% hydrolyzed) | 4.8 gms |
| hydroxyethylcellulose (30,000 cps) | 1.4 gms |
| sand (−30 mesh) | 600.0 gms |
| Total | 1000.0 gms |

When 69ml of water was added to a 300 grams portion of the mix, the resulting mortar showed good sag resistance and had other properties that made it a good dry-set mortar.

EXAMPLE VI

The following Dry-Set mortar mix was made:

| | |
|---|---|
| portland cement | 382.5 gms |
| methylcellulose (4000 cps) | 3.5 gms |
| polyvinyl alcohol (73% to 77% hydrolyzed) | 3.0 gms |
| attapulgite 11.0 | 11.0 gms |
| sand (−30 mesh) | 600.0 gms |
| Total | 1000.0 gms |

When 69 ml. of water was mixed with a 300 gm portion of the mortar mix, a sag resistant mortar with excellent workability resulted.

EXAMPLE VII

The following Dry-Set mortar mix was made:

| | |
|---|---|
| portland cement | 391.5 gms |
| methycellulose | 3.0 gms |
| sodium carboxylmethycellulose (D.S. approx. 0.4) | 0.5 gms |
| attapulgite clay* | 2.0 gms |
| sand (−50 mesh) | 600.0 gms |
| polyvinyl alcohol (73% to 77% hydrolyzed) | 3.0 gms |
| Total | 1000.0 gms |

*"Attagel 40" by Minerals and Chemicals Corporation of America was used

When water was added to 30 gms of the mix to make a workable Dry-Set mortar, it showed no sag in the standard test, had an acceptable open time of 45 minutes, and an initial set time of 9¼ hours. This example shows that sodium carboxymethylcellulose and attapulgite clay, both in minimal amounts, effect sag resistance.

EXAMPLE VIII

To the following basic Dry-Set mortar mix the ingredients listed below were added and then water was added to the mix and the resulting mortar was tested for sag resistance.

| | | |
|---|---|---|
| Basic Dry-Set mortar mix: | portland cement sand (−30 mesh) methylcellulose (4000 cps) | 100 gms 200 gms 1.8 gms |
| Additive to Basic mix | | Sag Resistance |
| a) Attapulgite clay, 3.0 gms | | fair |
| b) Attapulgite clay, 3.0 gms and "Reten 200", 0.15 gm | | good |
| c) Attapulgite clay, 3.0 gms, and "Reten A-1", 0.15 gm | | excellent (no sag) |
| d) no additive | | none |
| e) Attapulgite clay, 3.0 gms, and Alum, 0.3 gm | | fair |
| f) Attapulgite clay, 2.4 gms, and "Reten A-1", 0.15 gm | | excellent (no sag) |
| g) Attapulgite clay, 1.2 gms, and "Reten A-1", 0.15 gm | | very good |
| h) Attapulgite clay, 3.0 gms, and "Reten A-1", 0.05 gm | | excellent (no sag) |

NOTE:
"Reten 200" and "Reten A-1" are trade names of Hercules, Inc. for long chain acrylamide copolymers, nonionic and anionic, respectively.

The results show that the long chain acrylamide in very small amounts increases the effectiveness of attapulgite clay for imparting sag resistance to Dry-Set mortars. RETEN A-1 gave a Flocculation Index of 0.11 when tested as described in Example I at an 0.005 gram level. RETEN 200 gave a Flocculation Index of 0.40 at a 0.030 gram level.

EXAMPLE IX

Using the same Basic Dry-Set mortar mix in example VIII, the following additives were tested for their ability to impart sag resistance to Dry-Set mortars.

| Additive | Sag Resistance |
|---|---|
| a) bentonite clay, 3.0 gms | very good |
| b) bentonite clay, 2.0 gms | fair |
| c) bentonite clay, 2.0 gms and "Reten A-1", 0.05 gms | excellent (no sag) |

These results show that the ability of bentonite clay to effect sag resistance is enhanced by small amounts of the organic flocculating agent "RETEN A-1".

EXAMPLE X

Using the same basic Dry-Set mortar mix of example VIII, the following additives were tested for their ability to impart sag resistance to Dry Set mortars.

| Additive | Sag Resistance |
|---|---|
| a) slaked lime, 3.0 gms | none |
| b) slaked lime, 3.0 gms and "Reten A-1", 0.15 gm | very good |
| c) slaked lime, 2.0 gms and "Reten A-1", 0.10 gm | excellent (no sag) |

These results show that small amounts of long chain acrylamide copolymer can activate slaked lime to effect sag resistance in Dry-Set mortars.

EXAMPLE XI

Using the basic Dry-Set mortar mix from example VIII, the following additives were added to the dry mix, and water then added to make a mortar of workable consistency.

| Additive to Basic mix | Sag resistance |
|---|---|
| a) Talc, 3 gms | none |
| b) Talc, 3 gms and "Reten A-1", 0.15 gms. | excellent (no sag) |
| c) Talc, 2 gms and "Reten A-1", 0.05 gm. | excellent (no sag) |
| d) Wollastonite clay, 3 gms | none |
| e) Wollastonite clay, 3 gms and "Reten A-1", 0.15 gm. | excellent (no sag) |
| f) "Reten A-1", 0.10 gm | good |

EXAMPLE XII

To illustrate the fact that long chain acrylamide copolymer alone is not as effective as the combination of it with a clay, the following were added to the basic Dry-Set mortar mix and extra water was used to prepare the mortar. Instead of 23 ml. water per hundred grams of mix, 26 ml. water per hundred grams of mix was used. The resulting mortars were still workable and usable.

| Additive to Basic mix | Sag resistance |
| --- | --- |
| a) "Reten A-1", 0.15 gm. | fair |
| b) Talc clay, 3.0 gms and "Reten A-1," 0.15 gms | good |

EXAMPLE XIII

Using the basic Dry-Set mortar mix of example VIII, several categories of polymers known to cause flocculation in some systems were checked with wollastonite, talc, and lime, each polymer at the 0.10 percent level. The mortars were evaluated for whether they showed improved sag resistance or not.

| Polymer Additive | Wollastonite, 1% | Talc, 0.66% | Attapulgite 0.5% |
| --- | --- | --- | --- |
| a) hydroxyalkyl starch, (Hercules' Ceron 1104-B) | sag resistant | sag resistant | sag resistant |
| b) polyacrylic acid | no improvement | no improvement | sag resistant |
| c) polyethylene oxide (Union Carbide Corp's Polyox A 3253) | sag resistant | very little improvement | sag resistant |
| d) polyacrylamide (Dow Chemical Co's Separan NP20) | sag resistant | sag resistant | sag resistant | a) and d) above were effective with Wollastonite, talc and attapulgite and gave Flocculation Indices of 0.34 and 0.14, respectively. b) and c) were not effective with all of the clay additives and gave Flocculation Indices of 0.80 and 0.85, respectively.

Tests have shown that the polymers which provide the benefits of the invention must have a Flocculation Index less than about 0.50.

The following materials were not effective and do not satisfy the requirements of the invention:

| Additive to Basic Mix | Flocculation Index | Sag Resistance |
| --- | --- | --- |
| 1. RETEN SPX 5015 [low viscosity grade (10 cps at 1%) otherwise similar to RETEN A-11, 0.10 grams. RETEN SPX 5015 is a low molecular weight polyacrylamide. | 0.60 | none |
| 2. High molecular weight sodium carboxymethyl cellulose, degree of substitution 17 to 1.2, 0.15 gram. | | |
| 3. Polyacrylic acid, molecular wt. 16,000 to 20,000, 0.15 gram. | 0.80 | none |
| 4. RETEN 834.1 (60 cps at 1%), 0.10 gram. RETEN 834.1 is a low molecular weight polyacrylamide. | 0.89 | none |

I claim:

1. In a dry-set Portland cement mortar composition consisting essentially of, in the dry state, Portland cement and sand present in amounts sufficient to form a conventional mortar composition, and a minor amount of a water-soluble cellulose ether, the improvement consisting of the inclusion in the composition of from 0.5 to 3.0 percent by weight of an additive selected from the group consisting of montmorillonite clays and attapulgite clays, and mixtures thereof.

2. A composition as in claim 1, wherein the additive is a montmorillonite clay.

3. A composition as in claim 1, wherein the additive is an attapulgite clay.

4. A composition as in claim 1, wherein the additive is a mixture of attapulgite and montmorillonite clays.

5. In a dry-set Portland cement mortar composition consisting essentially of, in the dry state, Portland cement and sand present in amounts sufficient to form a conventional mortar composition, and a minor amount of a water-soluble cellulose ether, the improvement consisting of the inclusion in the composition of from 0.5 to 3.0 percent by weight of a first additive selected from the group consisting of montmorillonite clays, attapulgite clays, slaked lime, talc, kaolin, wollastonite, and mixtures thereof, said composition further having included in said composition of from about 0.01 to about 0.25 percent by weight of the composition of a long-chain polymeric compound additive having a Flocculation Index less then 0.50.

6. A composition as in claim 5, wherein the long-chain polymeric compound additive is hydroxalkyl starch.

7. A composition as in claim 5, wherein the long-chain polymeric compound additive is polyacrylimide.

8. A composition as in claim 5, wherein the long-chain polymeric compound additive is non-ionic long-chain acrylimide copolymer.

9. A composition as in claim 5, wherein the long-chain polymeric compound additive is anionic long-chain acrylimide copolymer.

10. A composition as in claim 5, wherein the long-chain polymeric compound additive is sodium carboxymethyl cellulose.

11. A composition as in claim 5, wherein the long-chain polymeric compound has a Flocculation Index less than 0.40.

12. A composition as in claim 5, wherein the long-chain polymeric compound has a Flocculation Index less than 0.30.

13. A composition as in claim 5, wherein the first additive is slaked lime and the long polymeric compound additive is polyacrylamide.

14. A composition as in claim 5, wherein the first additive is talc and the polymeric compound additive is polyacrylamide 15. A composition as in claim 5, wherein the first additive is wollastonite and the polymeric compound additive is polyacrylamide.

16. A composition as in claim 5, wherein the first additive is wollastonite and the polymeric compound additive is hydroxyalkyl starch.

17. A composition as in claim 5, wherein the first additive is talc and the polymeric compound additive is hydroxyalkyl starch.

18. A composition as in claim 5, wherein the first additive is attapulgite and the polymeric compound additive is hydroxyalkyl starch.

19. A composition as in claim 5, wherein the first additive is attapulgite and the polymeric compound additive is polyacrylamide.

* * * * *